United States Patent [19]

Haruta

[11] Patent Number: 4,602,302

[45] Date of Patent: Jul. 22, 1986

[54] AUTOMATIC REVERSING MECHANISM FOR CASSETTE TAPE RECORDING AND REPRODUCING APPARATUS

[75] Inventor: Masao Haruta, Saitama, Japan

[73] Assignee: Sony Corporation, Tokyo, Japan

[21] Appl. No.: 652,571

[22] Filed: Sep. 20, 1984

[30] Foreign Application Priority Data

Sep. 20, 1983 [JP] Japan .................................. 58-173917

[51] Int. Cl.$^4$ ........................ G11B 15/44; G11B 15/22
[52] U.S. Cl. ..................................... 360/74.2; 360/96.2
[58] Field of Search ................ 360/69, 71, 74.1, 74.2, 360/90, 93, 96.1, 96.2, 96.3, 137; 242/186–191

[56] References Cited

U.S. PATENT DOCUMENTS

| | | | |
|---|---|---|---|
| 3,946,436 | 3/1976 | Takashino | 360/74.2 |
| 4,147,898 | 4/1979 | Tozune et al. | 242/189 X |
| 4,238,808 | 12/1980 | Tomita | 360/74.2 |

*Primary Examiner*—Raymond F. Cardillo
*Assistant Examiner*—Steven R. Garland
*Attorney, Agent, or Firm*—Lewis H. Eslinger; Alvin Sinderbrand

[57] ABSTRACT

A tape cassette recording and reproducing apparatus is provided with a mechanism that automatically reverses the tape drive direction at the end of the tape when the apparatus is in the playback mode, yet automatically stops the tape drive when the apparatus is in the record mode. A further mechanism permits the reversing of the tape drive direction while in the playback mode and the stopping of the tape drive while in the record mode at any time prior to reaching the end of the tape, upon actuating the appropriate control. By utilizing only two mutually slidable elements, one of which is also able to be rotated through a short arc, and a locking element which cooperates with the slidable elements to control the tape drive mechanism and also controls the mode-selecting slide levers of the typical tape recorder, a compact control mechanism is provided that is suitable for use in a portable cassette tape recorder.

16 Claims, 14 Drawing Figures

FIG. 3
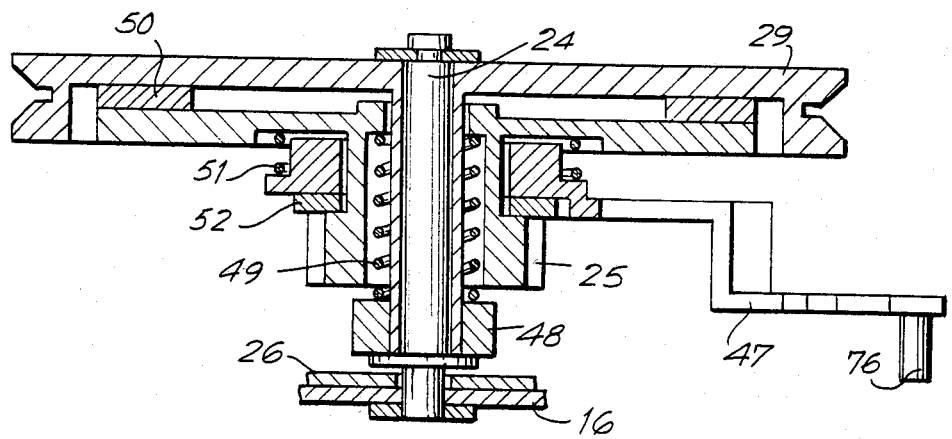
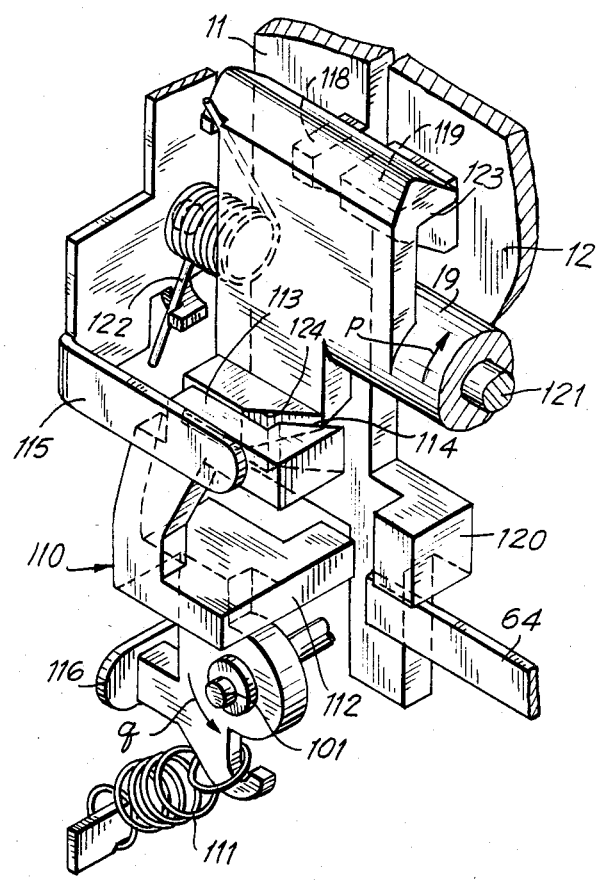
FIG. 5

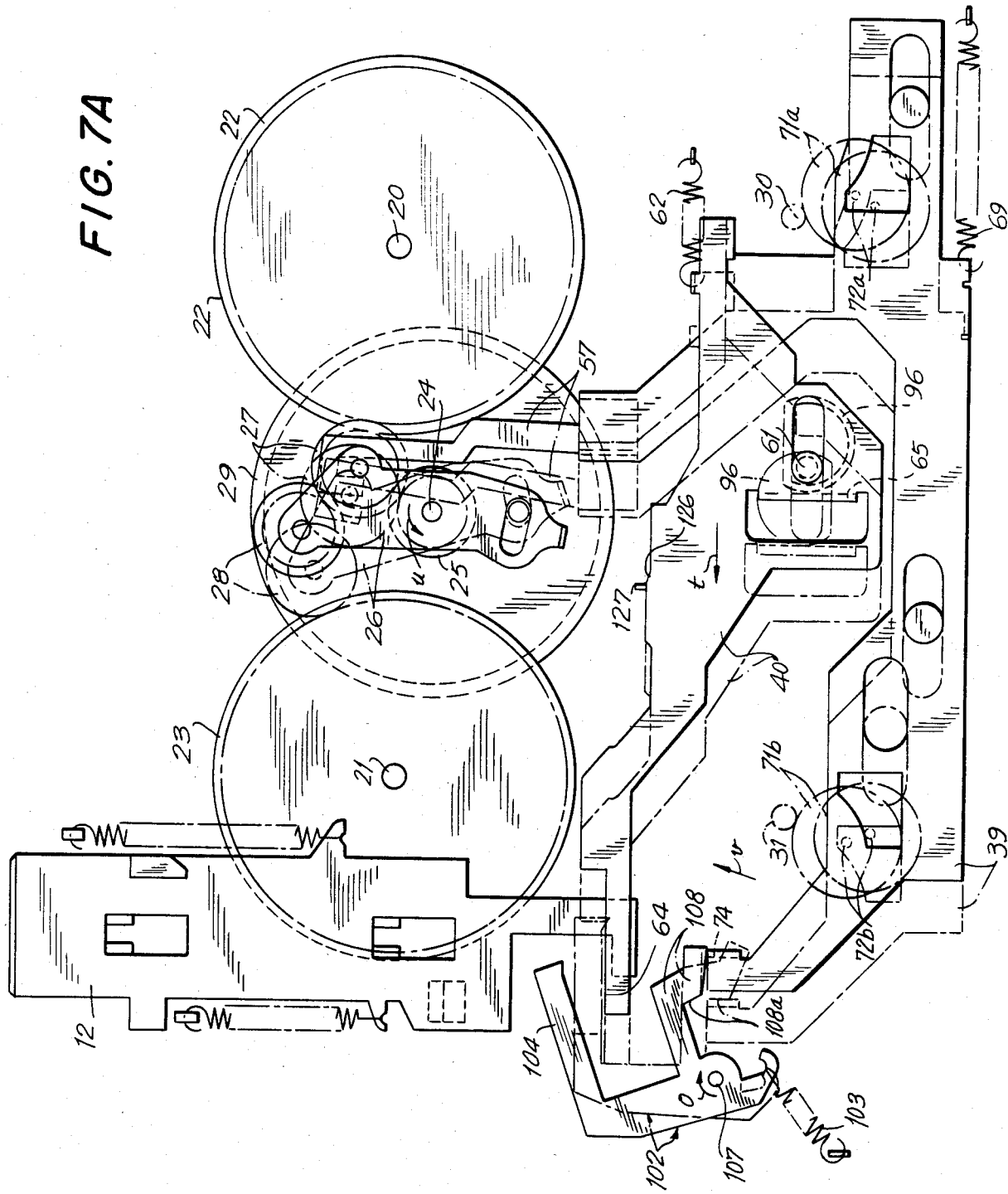

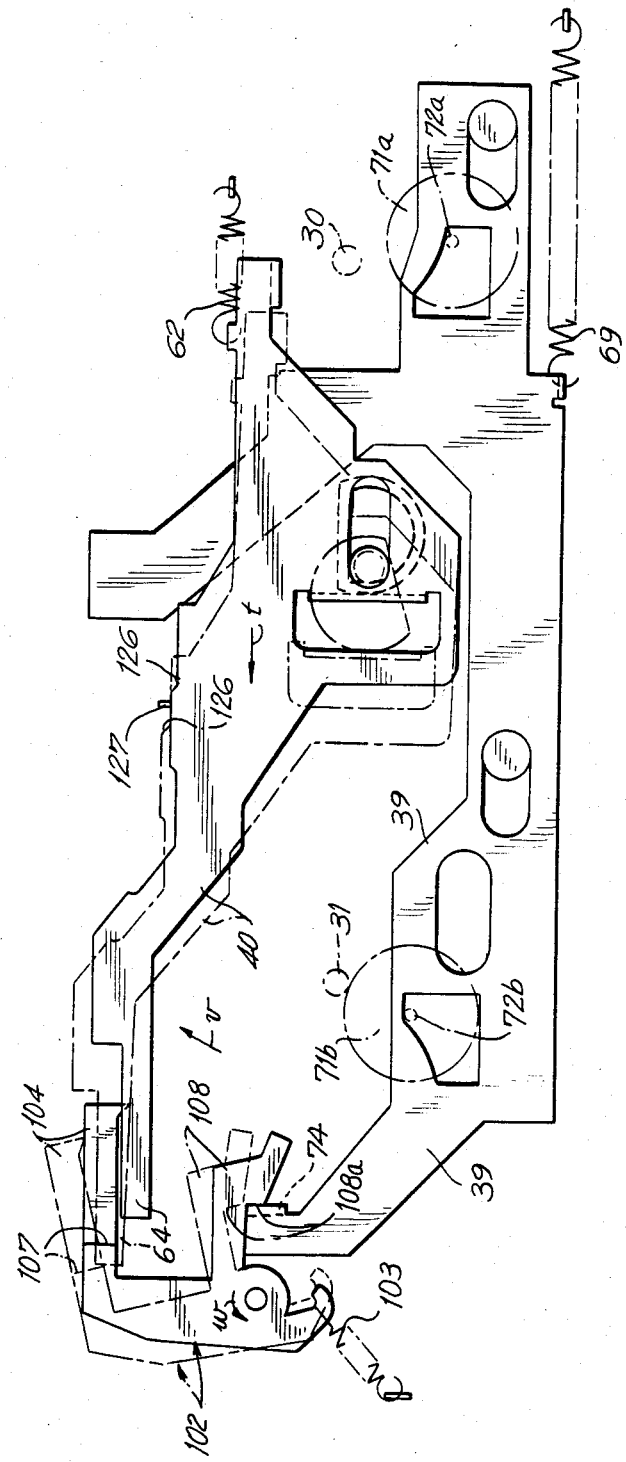

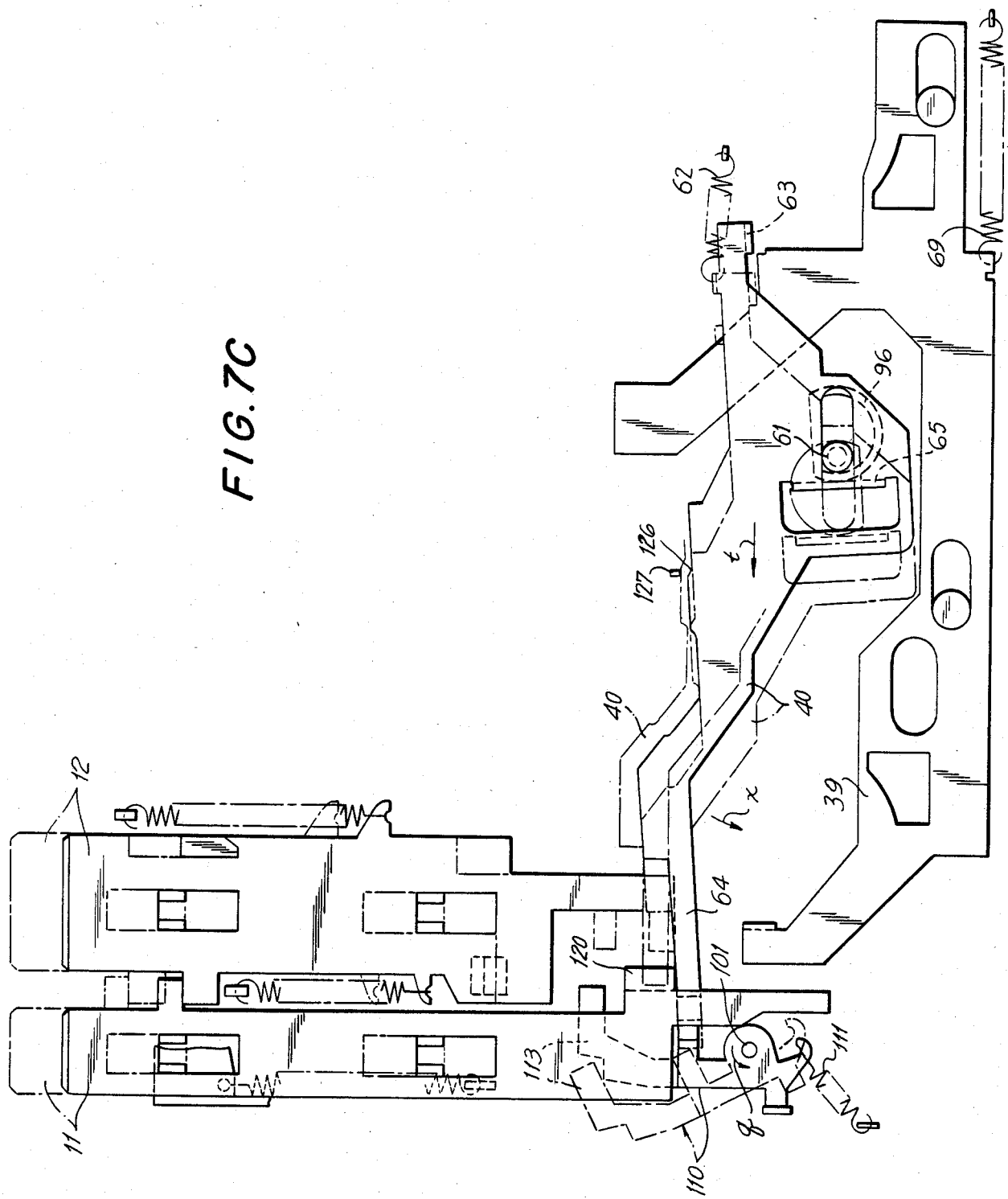

AUTOMATIC REVERSING MECHANISM FOR CASSETTE TAPE RECORDING AND REPRODUCING APPARATUS

BACKGROUND OF THE INVENTION

1. Field of the Invention

This invention relates generally to cassette tape recording and reproducing apparatus and, more particularly, to a mechanism for use with such tape recording apparatus to automatically change the direction in which the tape is being driven.

2. Description of the Prior Art

There have been proposed various mechanical and electrical arrangements for use in cassette tape recorders to provide automatic reversing of the tape drive direction. Typically, the direction in which the tape is driven is changed or reversed once the tape is completely unwound from the supply reel to the take-up reel during the playback mode of operation of the tape recorder.

Now, if the tape recorder is capable of recording signals as well as reproducing them, there are at least two different situations that must be considered when providing automatic reversing for such apparatus. One such situation would be that the apparatus would automatically change the tape-drive direction upon detecting the end of the tape, even though the apparatus is in the recording mode. In that case, however, because it is not desirable to record over an already recorded segment, it is therefore necessary to detect whether one or both of the pair of removable tabs, which are formed at the rear corners of all compact audio cassettes have been removed or punched out. These tabs are provided to prevent recording over already recorded material, and it is standard practice to remove the tabs once a recording has been made. Most tape recorders can sense the presence or absence of such tabs by means of switches to lock out the recording system, so that the tape cannot be inadvertently erased and re-recorded. The two tabs on the back wall of the cassette correspond to the two "sides" of the tape. Thus, in any automatic reversing system, a mechanism and electrical circuitry must be provided to detect the presence or absence of both tabs, so that the tape will not be inadvertently erased. Moreover, having such automatic reversing feature places the burden upon the user to pay strict attention to removing the tabs once a program has been recorded. The electrical circuitry and mechanism for detecting the presence of the tabs add to the cost of the unit, as well as to the complexity, and thus affect the reliability of the unit.

Another situation, which is more of a general nature, is the provision of a mechanism and circuitry to automatically stop the tape drive upon the detection of the tape end during the recording mode and to sequentially change the direction of the tape drive upon such tape-end detection during the playback mode. To implement this feature it is necessary to distinguish the recording mode of the apparatus from the playback mode, and this involves additional switches and the like corresponding to the various mode selecting switches of the unit. Also, some means for detecting the tape end must be provided and would typically incorporate logic circuitry connected to all of the switches to generate a control signal for operating a control mechanism, for example, a plunger-solenoid, to initiate the appropriate movements of the tape mechanism, upon detecting the tape end in the selected mode of the tape recorder. Once again, this necessary mechanism and electrical circuitry will increase the number of electrical and mechanical parts and thereby increase the cost of the apparatus. Also, because the typical tape recorder of today is intended for portable use, the miniaturization in size and the requirement to minimize electrical power consumption are of importance.

OBJECTS AND SUMMARY OF THE INVENTION

Accordingly, it is an object of the present invention to provide a mechanism for accomplishing automatic reversing of the tape drive in a cassette tape recording and reproducing apparatus that can eliminate the above-noted defects inherent in the prior art.

Another object of this invention is to provide a relatively simple and compact automatic mode changing mechanism for a cassette tape recording and reproducing apparatus that provides automatic reversing of the tape drive direction.

A further object of the present invention is to provide an improved automatic mechanism for changing the direction of the tape drive that can operate to stop the tape drive in response to a particular mode of the apparatus, in addition to reversing the tape-drive direction in another mode of the apparatus.

Still another object is to provide an improved automatic mechanism for use in a cassette tape recording and reproducing apparatus that can be employed in a portable cassette tape recorder and can provide automatic reversing operation in the playback mode.

In accordance with one aspect of the present invention, a cassette tape recording and/or reproducing apparatus is provided with automatic reverse capability by means of a mechanism to change the direction in which the tape is driven, as well as stopping the driving of the tape in predetermined modes. The tape drive direction is reversed automatically in the playback mode of the unit, but in the record mode the unit is stopped upon reaching the tape end. Also provided is a mechanism that can change the tape drive direction in the playback mode at any point along the tape without waiting for the end of the tape. A selectively controlled plunger solenoid is used to accomplish this, for example.

One embodiment of this automatic reversing mechanism comprises a slide lever which is actuatable between first and second positions to control the tape-drive mechanism and is biased to move to the first position by a return spring. A lock member is provided to hold the slide lever in the second position against the force of the return spring only when the lever corresponding to the forward or play mode of the apparatus is in its operative position and the slide lever is accordingly moved to its second position. A change lever is both slidable and rotatably mounted on the recording chassis and is moved and returned to respective first and second positions once in response to the detection of the tape end and is also rotated to an operative position by movement of a lever that selects the recording mode of the apparatus, so that the change lever is moved to a slanted position during its movement and return only in the recording mode of the apparatus. Wherein when the lever for the forward or playback mode is in the operative position, the change lever works in turn to move the slide lever from its first position to the second position and to move the lock member to release the slide from its second position. On the other hand, in the recording mode of the apparatus, the lever used in the play mode is released from its operative position by the sliding of the change lever in its slanted posture.

The above, and other objects, features, and advantages of the present invention will become apparent from the following detailed description of illustrative embodiments thereof to be read in conjunction with the accompanying drawings.

BRIEF DESCRIPTION OF THE DRAWINGS

FIG. 3 is a cross-sectional view taken through an intermediate pulley of the mechanism of FIG. 2;

FIG. 5 is a perspective of the mechanism for locking the mode selecting levers of the tape recording and/or reproducing apparatus to show the operation of the present invention;

FIG. 7A is a plan view of the inventive automatic mechanism illustrating the movement for changing the direction of the tape drive from a normal direction to the reverse direction during the playback mode of the tape recorder;

FIG. 7B is a plan view of the automatic mechanism according to the present invention illustrating the movement for changing from the reverse direction of the tape drive from the normal direction, as shown in FIG. 7A, during the playback mode, with certain parts and elements not shown in the interest of clarity;

FIG. 7C is a plan view of the automatic mechanism according to the present invention showing the movement for stopping the driving of the tape in the recording mode of the apparatus;

DETAILED DESCRIPTION OF PREFERRED EMBODIMENTS

Figure 1:
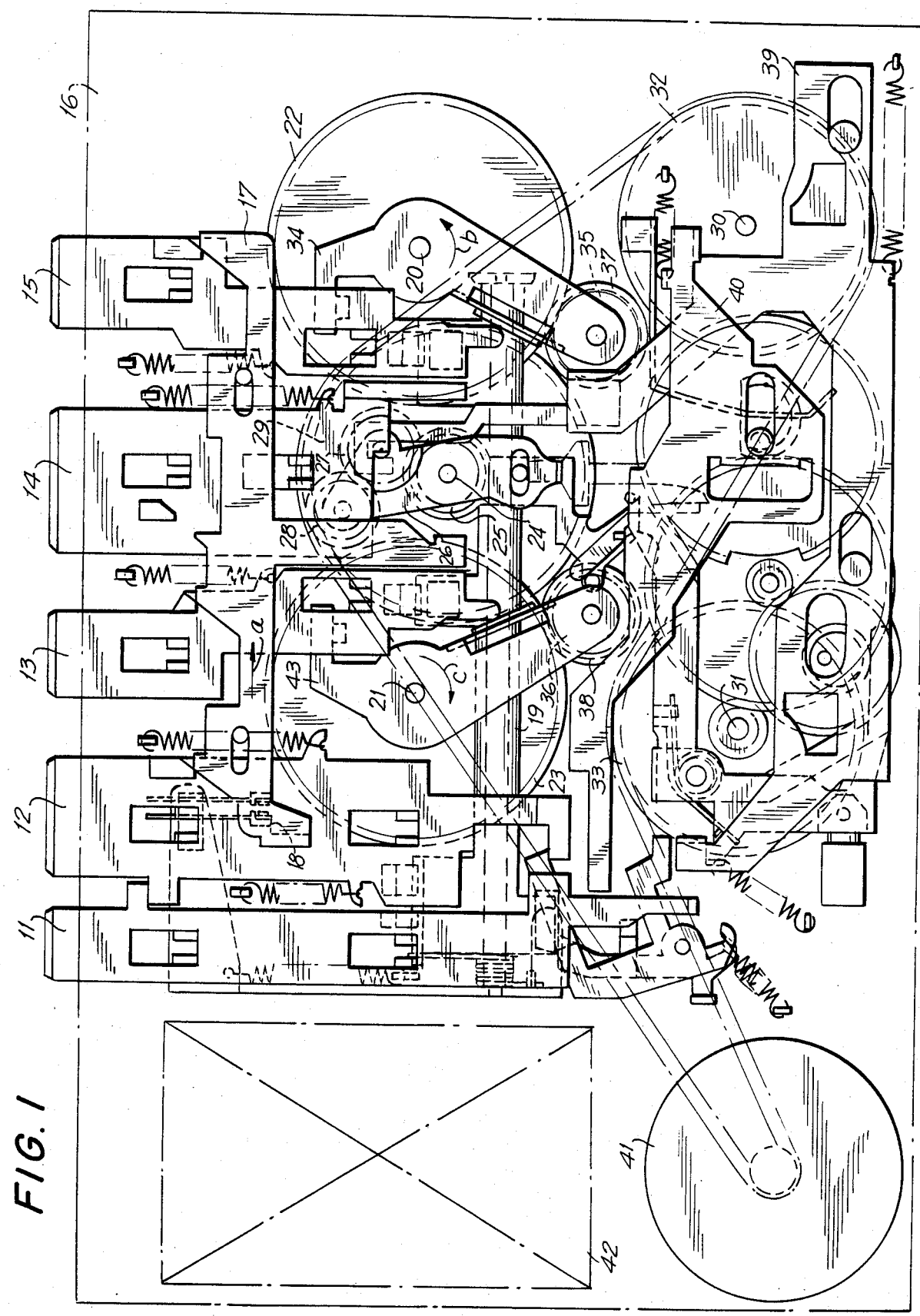
FIG. 1 is a plan view of a cassette tape recording and/or reproducing apparatus having a mechanism according to one embodiment of the present invention, with certain noninventive elements of the apparatus not shown in the interest of clarity.

FIG. 1 is a plan view of a tape recording and reproducing apparatus employing the inventive automatic reverse mechanism of the present invention, in which certain of the elements of the tape recording apparatus that are not directly related to the present invention are not shown in the interest of clarity. Operating levers 11, 12, 13, 14, and 15 are slidably arranged on chassis 16 and provide mode selection corresponding to record, playback, rewind, stop, and fast forward, respectively. A slide lever 17 is arranged transversely to the direction of travel of levers 11 through 15 and is movable in such transverse direction and when moved in the direction of arrow a operates to close switch contacts 18, the leftmost switch contact being affixed to the end of slide lever 17 so as to move into contact with the other switch contact. In FIG. 1, slide lever 17 is arranged to move in the rightward direction upon a downward sliding of one of the levers 11 through 15 into their respective operative positions. A lock plate 19 is pivotably mounted about an axis, shown in dashed lines in FIG. 1, and includes latch elements for locking levers 11, 12, 13, and 15, respectively. Lock plate 19 rotates about the pivot axis when stop lever 14 is actuated, so that levers 11, 12, 13, or 15 are then moved back to there inoperative position, and thereby moving slide lever 17 back to its original position so that switch contacts 18 are opened, as shown in FIG. 1.

Two rotary axis elements 20, 21 are rotatably mounted by respective bearing elements, which are affixed to chassis 16. Rotary axis elements 20, 21 extend upwardly and tape reel spindles (not shown) are attached to the ends thereof so as to rotate integrally therewith. A pair of reel gears 22, 23 are also formed integrally with the rotary axis elements 20, 21, respectively. A fixed axis element 24 is mounted on chassis 16 and is centrally arranged between rotary axis elements 20, 21 and around fixed axis 24 are rotatably mounted an intermediate gear 25 and a swing arm 26. A first gear 27 is provided to mesh with intermediate gear 25 and, similarly, a second gear 28 is provided that meshes with first gear 27, both of which are rotatably mounted to swing arm 26. In response to a clockwise rotation of swing arm 26, first gear 27 meshes with reel gear 22, which corresponds to the takeup reel, and, thus, the magnetic tape of the tape cassette is taken up at a constant speed in the normal or playback direction. On the other hand, in response to counterclockwise rotation of swing arm 26, second gear 28 cooperates with reel gear 23 to take up the magnetic tape at a constant speed in the reverse or rewind direction. Note that this is not the typical tape rewind mode, as might be selected by lever 13. Intermediate gear 25 is caused to be rotated by pulley or sleeve 29 coaxially mounted for rotation with axis element 24.

In order to provide tape drive in both directions a pair of capstans 30, 31 extend upwardly relative to chassis 16 and are rotatably supported by bearings (not shown) mounted in respective spaced-apart relationship in chassis 16. Two flywheels 32, 33 are formed integrally with capstans 30, 31, respectively, and a pair of pivot arms 34, 43 are mounted to pivot around rotary axis elements 20, 21 in the direction of arrows b and c, respectively, in response to movement of levers 13 and 15, corresponding to rewind and fast forward, respectively. When levers 13, 15 are moved into there operative positions the magnetic tape is driven in the appropriate direction at a speed substantially greater than the playback or record speed. A pulley 35 is rotatably mounted at one end of pivot arm 34 and upon rotary movement of pivot arm 34 in direction b, pulley 35 is rotatably engaged with flywheel 32. Another pulley 36 is rotatably mounted at one end of pivot arm 43 and is operably engaged with flywheel 33 upon movement of pivot arm 43 in the direction of arrow c. Mounted coaxially with pulley 35 on pivot arm 34 is gear 37, which can be operatively engaged with reel gear 22. Similarly, mounted coaxially with pulley 36 on arm 43 is gear 38, which can be operatively engaged with reel gear 23.

Sliding element 39 is provided to operably change the positions of the pinch rollers (not shown in FIG. 1) to engage the respective capstan 30, 31 and also to pivot or rotate swing arm 26. A change lever 40 is mounted for rotational motion and sliding motion on chassis 16 and operates in accordance with the different modes of the apparatus, as selected by slide levers 11 through 15.

Figure 2:
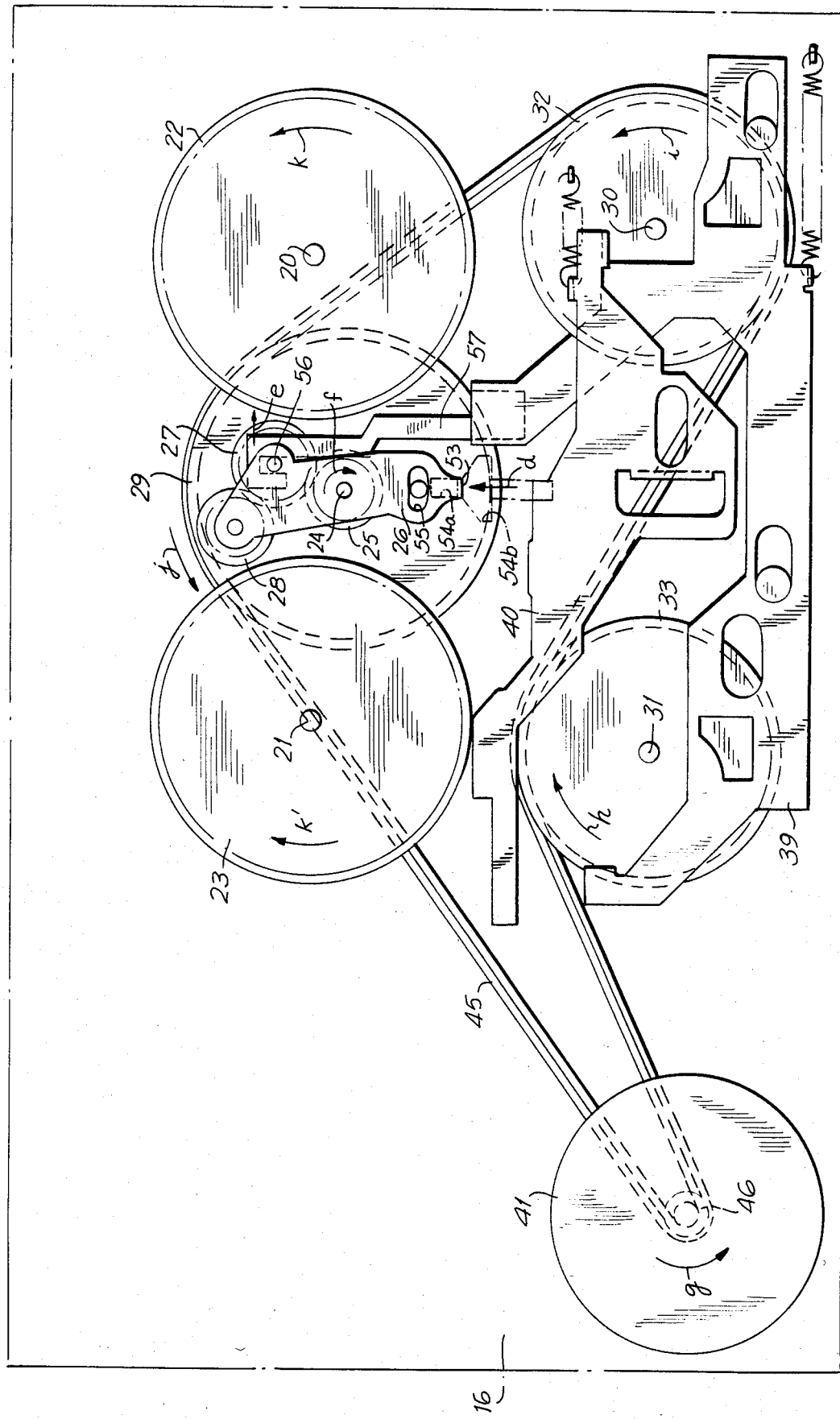
FIG. 2 is a plan view of the apparatus of FIG. 1 having more elements removed to show the inventive tape drive mechanism more clearly.

The mechanism used to drive the magnetic tape in the recording and reproducing apparatus is described in relation to FIGS. 2 and 3, in which two flywheels 32, 33, pulley 29, and a pulley 46 of the drive motor 41 are operably interconnected by endless belt 45, which is wrapped therearound. As represented by arrows i and g in FIG. 2, flywheels 32 and 33 will be rotated by endless belt 45 in opposite directions. Motor 41 is arranged substantially in line with the two flywheels 32, 33 and is preferrably mounted to permit lateral adjustment to control the tension on belt 45.

Referring then to FIG. 3, it can be seen that pulley 29, intermediate gear 25, swing arm 26, and a detecting lever 47 are rotatably mounted around fixed axis element 24, which is arranged to extend upwardly from chassis 16. Intermediate gear 25 is frictionally driven by contact with pulley 29 through action of a friction ring 50 disposed between a lower, flat surface of pulley 29 and an upper, flat surface of intermediate gear 25. A coil spring 49 is arranged between intermediate gear 25 and a washer 48, which is affixed to the inner sleeve of pully 29 and which extends the length of axis element 24. Detecting lever 47 is also frictionally coupled to intermediate gear 25 through means of a second coil spring 51 and a second friction ring 52. Contrary to such frictional engagement of the various elements on axis element 24, swing arm 26 is arranged for free rotation about axis element 24.

As seen in FIG. 2, at one end of swing arm 26 the first gear 27 and second gear 28 are rotatably mounted, whereas at the other end of swing arm 26 there is an upraised projecting element 53 which is formed integrally with swing arm 26 and is raised above the plane thereof. Projecting element 53 is inserted into a keyhole shaped slot 54, represented by dotted lines in FIG. 2 and swing arm 26 is maintained in its neutral position by projecting element 53 residing in a narrower portion 54a of the slot, when a head plate is in a rearwards position, and swing arm 26 is allowed to rotate in the wider portion 54b of the slot, when the head plate is moved forward into the playback or recording mode of the apparatus. The head plate is found in all cassette recorders and has the magnetic heads mounted thereon and is arranged for sliding movement into contact with the tape in the two stated modes. The rotation or pivoting of swing arm 26 is guided and limited by the engagement between the arcuate slot 55 formed in swing arm 26 and a pin shown centrally arranged therein, that is arranged to extend from chassis 16. A flat plate spring 57 is affixed to slider element 39 at one and at the other end is arranged to be hooked around an axis element 56 of first gear 27, which mounted on swing arm 26, and operates to generate a force to move first gear 27 in the direction indicated by arrow e. Thus, when swing arm 26 is caused to rotate into the playback or recording mode of the tape cassette apparatus, first gear 27 is caused to mesh with reel gear 22 by rotary movement of swing arm 26 in the direction of arrow f. In such operation then, because motor 41 rotates in the direction arrow g, flywheels 32, 33 and pulley 29 are rotated in the directions indicated by arrows i, h, and j, respectively. Accordingly, reel gear 22 is then driven in the rotary direction of arrow k. On the other hand, when swing arm 26 is caused to rotate in the direction opposite to arrow f, second gear 28 will become meshed with reel gear 23 and will cause reel gear 23 to rotate in the direction of arrow k'.

As described above in relation to the mechanism for driving the magnetic tape, and as shown in FIG. 3, intermediate gear 25, which is disposed between the two reel gears 22, 23, is rotated directly by action of endless belt 45 and, therefore, a simple and substantially compact mechanism is provided. Additionally, by locating motor 41 in line with the pair of flywheels 32, 33, a space on the chassis 16 is made available for locating the battery box, shown generally at 42 in FIG. 1. Accordingly, if the axis of rotation for a cover member or cassette holder (not shown) of the tape recording and/or reproducing apparatus is arranged generally along the line defined by flywheels 32, 33 and motor 41 it is possible then to easily gain access to the battery box 42 when the cassette cover member is in its open position.

Figure 4:
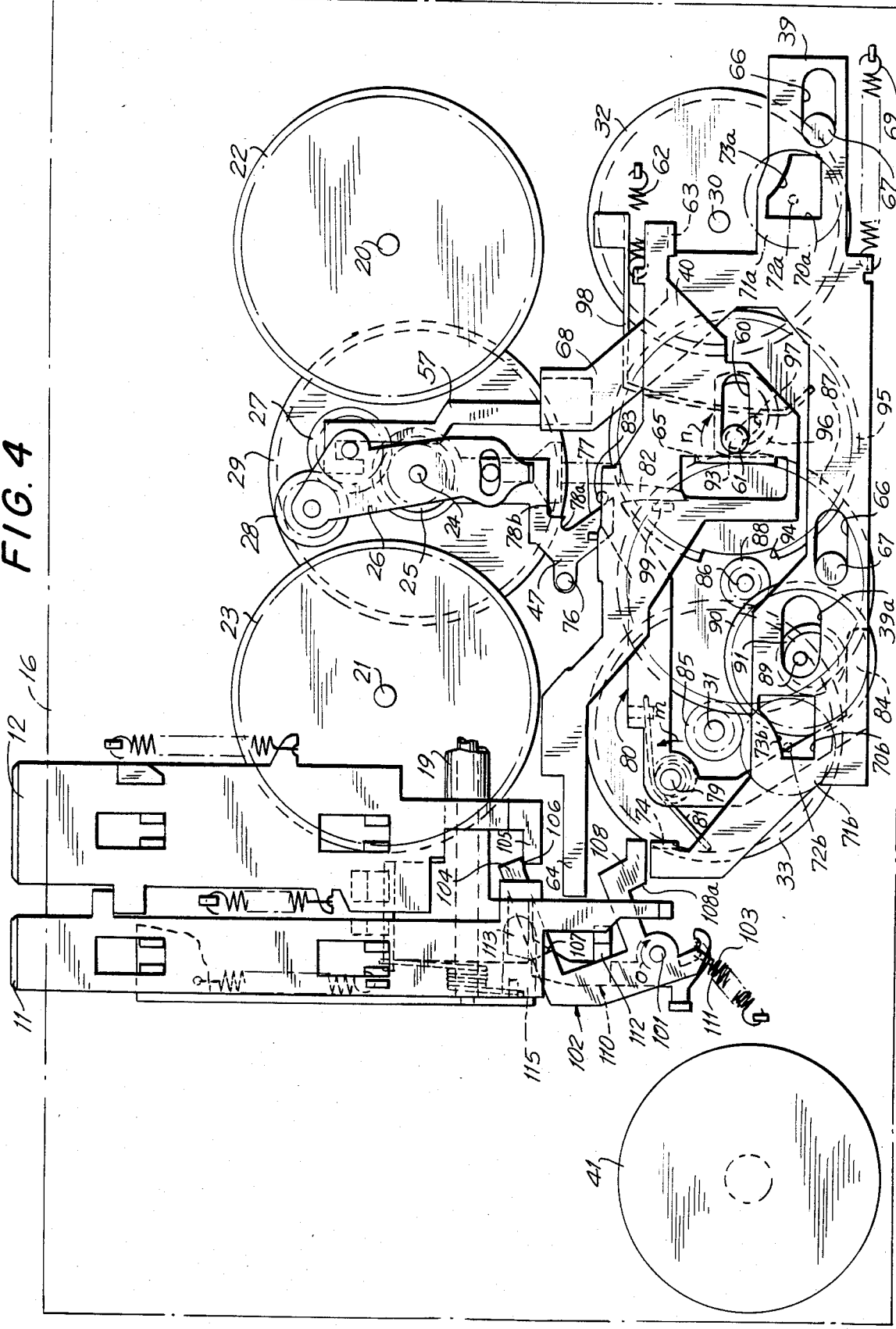
FIG. 4 is a plan view of the mechanism according to the present invention for automatically changing the direction in which the tape is driven and for stopping the driving of the tape.

A description of the mechanism provided by the present invention for automatically changing the direction of drive of the magnetic tape is now set forth in relation to FIG. 4, in which change lever 40 is seen again to lie beneath chassis 16 and is arranged so that one end thereof faces capstan 30, wherein the other end thereof is arranged facing an end portion of record lever 11. Change lever 40 is both slidably and rotatably mounted by action of pin 61, which is affixed to chassis 16, and which is arranged within slot 60 formed in a general longitudinal direction along change lever 40. By action of a tension spring 62 change lever 40 is urged in the right-hand direction, as shown in FIG. 4, and is normally positioned in its inoperative position. Arranged at the end of slide lever 40 adjacent capstan 30 is a bent portion 63 that is formed at right-angle to flat, slide lever 40, which is intended to engage slider 39, and at the other end of slide lever 40 is an extension arm 64. Located around the center of lever 40 is a wall 65 formed by bending a portion upwardly from below lever 40 and this wall 65 is engaged with the outer surface of a cam member 96. Slider 39 is arranged beneath slide lever 40 and is slidably mounted by action of a pair of slot-pin combinations, each being formed of an enlongated longitudinal slot 66 and an upraised pin 67, affixed to chassis 16 and arranged within its respective slot 66. Slider 39 is also arranged between capstan 30 and the record lever 11 and is formed having a center arm element 68 to which plate spring 57 is affixed. Slider 39 is urged to move in the right-hand direction, as seen in FIG. 4, by action of spring element 69 and is thus retained in a first position, as shown in FIG. 4. Formed in slider 39 are symmetrical cutouts, which have a generally square shape in which one corner of each has an arcuate intruding segment. These arcuate segments are symmetric with each other and in the right-hand cutout is represented as wall 73a and in the left hand cutout is represented as wall 73b. Two pinch rollers are provided to cooperate with the two capstans 30, 31 and, specifically, a pinch roller 71a and arranged to cooperate with capstan 30 and pinch roller 71a is rotatably mounted around axis element 72a. Similarly, a pinch roller 71b is arranged to cooperate with capstan 31 and is mounted for rotation on axis element 72b. Axis elements 72a, 72b are arranged to extend to such an extent that their location can be controlled by the arcuate shaped walls 73a and 73b, respectively. When slider 39 is in the first position, as shown in FIG. 4, which corresponds to the playback or record mode of the apparatus, even though both pinch rollers 71a, 71b are urged to move towards capstans 30, 31, respectively, only pinch roller 71a can be moved to engage capstan 30. This is because of the location in the respective cutout of axis element 72a of pinch roller 71a. On the other hand, pinch roller 71b is then prevented from moving by interaction of the tapered wall 73b and axis element 72b. Formed at the left-most end of slider 39 is an angled portion 72 that is is provided so that slider 39 can be locked in a second, left-most position.

Detecting lever 47, rotatably mounted about axis 24, is seen clearly in FIG. 3 and has a shape that may be similar to a key and is provided with a pin 76 at one end that extends below the general level of detecting lever 47 and is also provided with a tapered guide surface 77 that includes first and second arcuate recesses 78a and 78b which are continuously formed adjacent one another.

An axis element 79 is fixedly mounted to chassis 16 and supports and rotatably mounts a cam following arm 80, at one end of which is arranged a stopper element 82 and a pin element 83 that extends below the level of the cam follower arm 80. Cam follower arm 80 is somewhat U-shaped and at the other arm of the U opposite pin 83 is arranged a cam following portion 84. Also mounted around axis element 79 is a spring element 81 that operates to urge cam follower arm 80 to rotate in the counterclockwise direction, as represented by arrow m. Affixed to capstan 31 is a relatively small diameter gear 85 that is intended to be meshed with a relatively larger diameter gear 87, which is rotatably mounted around axis element 86. Formed coaxially and integrally with a large gear 87 is a drive gear 88 that is intended to cooperate with gear 90 that is rotatably mounted on axis element 89, which is affixed to and extends up from chassis 16 in such a fashion that gear 90 is always meshed with drive gear 88. Formed integrally with gear 90 is a gear 91 that has an eccentric peripheral cam surface, which is intended to engage with cam following portion 84 of the U-shaped cam follower arm 80.

An axis element 93 is affixed to chassis 16 and has rotatably mounted thereon a gear 95, which has on its periphery a toothless portion 94 and also has integrally formed thereon eccentric cam element 96 that rotates with gear 95 about axis 93. Because gear 95 and cam 96 are integrally formed, cam 96 will rotate with gear 95 when the latter is meshed with drive gear 88. Gear 95 will be urged to rotate in the direction of arrow n by pressure from an L-shaped spring 98 against an eccentric element 97, which extends from the center portion of gear 95. When stopper element 82, which is formed as a part of cam follower arm 80, contacts projection 99 formed on gear 95, the toothless portion 94 of gear 95 will face, or be adjacent to, drive gear 88, so that gear 95 is then out of engagement with drive gear 88.

A locking lever 102 is rotatable mounted about an axis element 101 that is affixed to chassis 16 in the vicinity of motor 41. Locking lever 102 is urged to rotate in a rotary direction indicated by arrow o by spring 103 and is provided with a projecting surface 106 of a first arm 104, which is intended to contact stopper arm 105 arranged at the end of playback lever 12, when playback lever 12 is in its inoperative position. In this fashion, locking lever 102 is maintained in its inoperative position. Also formed on first arm 104 of locking lever 102 is a step portion 107, which is intended to cooperate with the end of extending arm 64 of slide lever 40 when locking lever 102 is in its operative position and slide lever 40 has moved to its left-most position in the assembly, as shown in FIG. 4. Additionally, locking lever 102 is provided with a second arm 108, which is formed to lock slider 39 in its second or left-most position by operative engagement between side surface 108a and the bent portion 74 that is at right-angles to flat slider 39. An intermediate lever 110 located beneath locking lever 102 in FIG. 4 is also rotatably mounted about axis element 101 and is urged independently of locking lever 102 to rotate in the same direction, as represented by arrow o. A first projecting element 112 of intermediate lever 110 is provided to operate upon the end of extending arm 64 of change lever 40 and a second projecting element 113 of lever 110 is provided with a tapered cam surface 114, which is shown in more detail in FIG. 5. Also shown in FIG. 5 are the stopper frames 115, 116 that respectively operate to prevent intermediate lever 110 from slipping off axis element 101 during rotation and for positioning intermediate lever 110 in its inoperative position against the force of spring 111.

Referring more particularly to FIG. 5, the specific mechanism of lock plate 19 and intermediate lever 110 is shown in detail, in which a pair of projections 118 and 119 are formed at the relative ends of the record lever 11 and playback lever 12, respectively. Another projection element 120 extends from record lever 11, in order to engage the extending arm 64 of plate 39 when record lever 11 is moved in a right-angle direction relative to extension arm 64. Lock plate 19 is rotatably mounted about axis element 121 and is urged for rotation in the direction of arrow p by operation of spring 122. Arranged on lock plate 19 is a claw element 123 that can hold or capture both projections 118 and 119 at the same time. A tapered cam 124 is formed on a projection at the opposite side of claw 123 and is intended to cooperate with cam surface 114 formed on a projection 113 of locking lever 110. When intermediate lever 110 rotates in the direction of arrow q against the force of spring 111, tapered cam surface 114 formed on projection 113 will contact the tapered cam surface 124 of lock plate 19, and thereby lock plate 19 will be rotated in a direction opposite that of arrow p so that engagement between claw 123 and projections 118 and 119 is released. That is, the record and playback levers 11, 12 can operate in sliding fashion without interaction with the locking assembly.

Figure 6A:
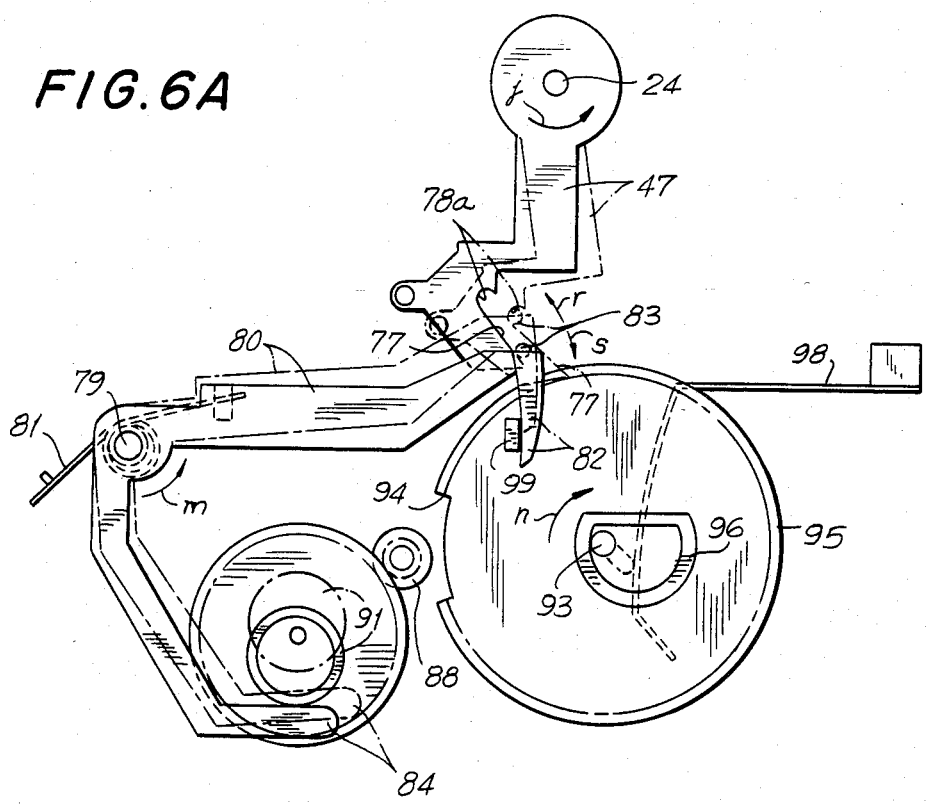
FIGS. 6A and 6B are plan views representing the sequential movement of elements according to the present invention for detecting the end of the tape.

The elements described hereinabove comprise a mechanism for automatically changing direction of the tape-drive, and the operation of this mechanism can be seen more clearly in FIGS. 6A through 7C in which, as described hereinabove, detecting lever 47 is frictionally coupled to intermediate gear 25 so that lever 47 is urged to rotate in the direction of arrow j when the tape is running, that is, being transported from one take-up reel to the other. Nevertheless, cam follower arm 80 is urged to rotate in the direction of arrow m by means of spring 81 and is driven back and fourth in opposite directions, as represented by small arrows r and s, respectively, in response to rotation of eccentric cam 91 contacting arm 84 thereof. Thus, due to the above-described action of cam follower arm 80, stopper 82 and pin 83 also travel between two locations, as represented by the same two arrows r and s. Because detecting lever 47 is urged to rotate in the direction of arrow j, as previously described hereinabove, pin 83 will always maintain contact with guide surface 77 during the motion of cam follower arm 80. Thus, when pin 83 moves in the direction of arrow r it will be stopped by the first arcuate recess 78a and, thus, the cam follower stroke or movement of arm 80 between the solid line position and the broken line position in FIG. 6a is relatively short when the tape is running. Thus, stopper 82 will still hold projection 99 during this short stroke of movement of arm 80.

Figure 6B:
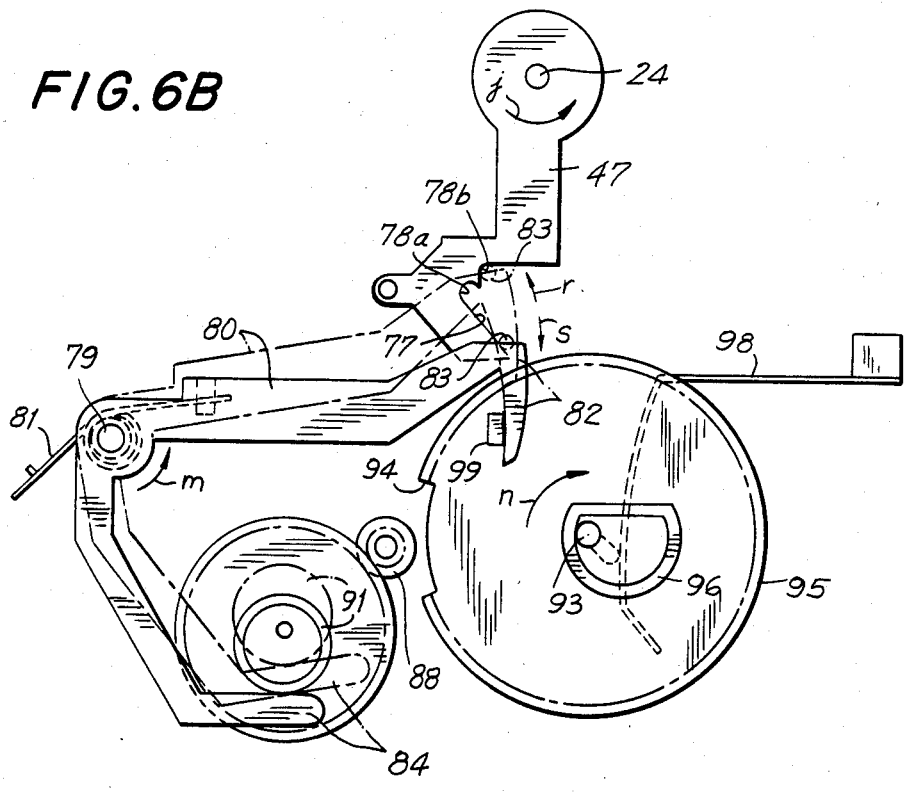

Continuing further with the description of the operation, when the tape has been fully unwound during the playback mode of the apparatus, for example, reel gear 22 will cease rotation and first gear 27 and intermediate gear 25 will also stop rotating, and the force being applied to detecting lever 47 will disappear or be removed at that time. Thus, because detecting lever 47 remains at the position as shown in FIG. 6b, pin 83 will move toward the second arcuate recess 78b when cam follower arm 80 rotates in the direction of arrow r, and the stroke of movement of cam follower arm 80 will be longer so that stopper element 82 will release projection 99 formed integrally on the flat surface of gear 95. Then gear 95 is caused to rotate in the direction of arrow n by the action of the plate spring 98, and gear 95 meshes with drive gear 88 and eccentric cam 96 will rotate once through an angle of 360°.

By means of the operative engagement between eccentric cam 96 and wall 65 of change lever 40, as seen for example in FIG. 4, when cam 96 begins to rotate, change lever 40 will move along in the direction of arrow t, as shown in FIG. 7a, against the force of spring 62. Slider 39 is then pushed by bent portion 63 of change lever 40 so that the two elements move together in the direction of arrow t. Additionally, locking lever 102, which is used to lock slider 39, is now permitted to rotate in the direction of arrow o, as seen in FIG. 7A, because stopper arm 105 formed on playback lever 12 releases projection 106 of locking lever 102 from contact therewith and when slider 39 moves completely to the second position, at the left in FIG. 7a, locking lever 102 rotates in the direction of arrow o under the force of spring 103 so that the surface 108a of second arm 108 holds the angular portion 74 of slider 39 and keeps it in its second, left-most position.

Responsive to the movement of slider 39 along the direction of arrow t, pinch roller 71b contacts capstan 31 and swing lever 26 rotates in the direction of arrow u through action of the flat, plate spring 57. The rotation of pulley 29 is transmitted to reel gear 23 through intermediate gear 25 and first and second gears 27 and 28, as shown in the dashed lines in FIG. 7A, so that the playback mode in the reverse direction of the tape automatically occurs. Thus, automatic changing of tape direction in the playback mode is performed by the rotation of eccentric cam 96 through an angle of 0° to 180° and, in response to the further rotation of cam 96, change lever 40 is moved back under the force of spring 62, and the toothless portion 94 of gear wheel 90 will once again be in juxtaposition with drive gear 88 and projection 99 will contact stopper 82 to prevent further rotation of cam 96. Change lever 40 is urged to rotate about pin 61 in the direction of arrow v as shown in FIGS. 7A and 7B by the force of spring 62 when change lever 40 moves along direction of arrow t, however, the rotation of change lever 40 is limited by the engagement between projection surface 126 and guide pin 127, so that change lever 40 then moves together with slider 39, and the rotation of change lever 40 is still limited by the engagement between bent portion 63 of change lever 40 and slider 39.

Turning now to FIG. 7B, operation of the automatic device to change the direction of tape drive from the reverse play direction to the normal play direction in the playback mode will be described, in which even though the tape is running in the reverse direction during playback the detection lever 47 and arm 80 will operate as described in relation to FIG. 6A. That is, when the tape is fully unwound in the reverse direction from the original take-up reel back to the supply reel, reel gear 23 will again stop rotating and the exact same operations will be generated, as shown and described in relation to FIG. 6B. Therefore, as explained above gear 95 and eccentric cam 96 rotate together and thereby change lever 40 is moved again in the direction of arrow t. Nevertheless, at that same time slider 39 is already locked in its second, left-most position so that bent portion 63 of change lever 40 is freed from engagement slider 39. Thus, when the projecting surface 126 passes guide pin 127, change lever 40 tends to rotate about pin 61 in the direction of arrow v under the force of spring 62. The end of extending arm 64 of change lever 40 pushes against the step portion 107 of locking lever 102 to cause it to rotate in the direction of arrow w, so that the lateral surface 108a of arm 108 releases the bent portion 74 of slider 39. Then, slider 39 is moved in the right-hand direction along with change lever 40 under the force of springs 62 and 69, and the operational mode of the apparatus is automatically changed to the playback mode in the normal direction, as represented by the solid lines in FIG. 7A.

Turning now to FIG. 7C, the operation of the inventive mechanism that automatically stops the driving of the tape in response to the detection of the tape end in the recording mode of the apparatus will be described in detail. In such situation when the tape is running in the normal direction in the recording mode, detecting lever 47 and cam follower arm 80 will operate in the same fashion as described in relation to FIG. 6A, and when the tape is fully unwound and reel gear 22 stops rotating that same operation will be generated as represented in FIG. 6b. Therefore, gear 95 and its eccentric cam 96 will rotate together, and change lever 40 will be moved along in the direction of arrow t, as explained in relation to FIG. 7A. Nevertheless, in this recording mode of the apparatus the record lever 11 is depressed so that projection 120 thereon is pushed against extension arm 64, thereby rotating change lever 40 in the direction of arrow x. Because bent portion 63 of change lever 40 is then moved away from slider 39 by the rotation of change lever 40 in the direction of arrow x, slider 39 will remain in its right-hand position when change lever 40 is moved in the direction of arrow t. The end of extension arm 64 is then faced against a first projection 112 of an intermediate lever 110 and in response to movement of change lever 40, in the direction of arrow t, lever 110 will be rotated in the direction of arrow q against the force of spring 111.

As described hereinabove in regard to the mechanism shown in FIG. 5, when intermediate lever 110 is rotated under the action of extension arm 64, tapered cam 114 of lever 110 will contact the other tapered cam 124 formed on lock plate 19. Therefore, lock plate 19 will be rotated in a direction opposite to that of arrow p and around an axis element 121, so that claw 123 and projections 118 and 119 are disengaged. When both levers 11, 12 are moved back to their at-rest position under the force of their respective return springs, switch 18, the contacts of which were shown FIG. 1, is turned off, thereby automatically changing from the recording mode in the normal direction of tape drive to the stop mode, that is, recording is terminated.

In keeping with the present invention only one change lever 40 is required to operate three different kinds of mode changing apparatus, specifically, for changing from the normal direction to the reverse direction, and from the reverse direction to the normal direction, both such changes occurring in the playback mode, and also for changing from the normal direction in the recording mode to the stop mode.

Figure 8:
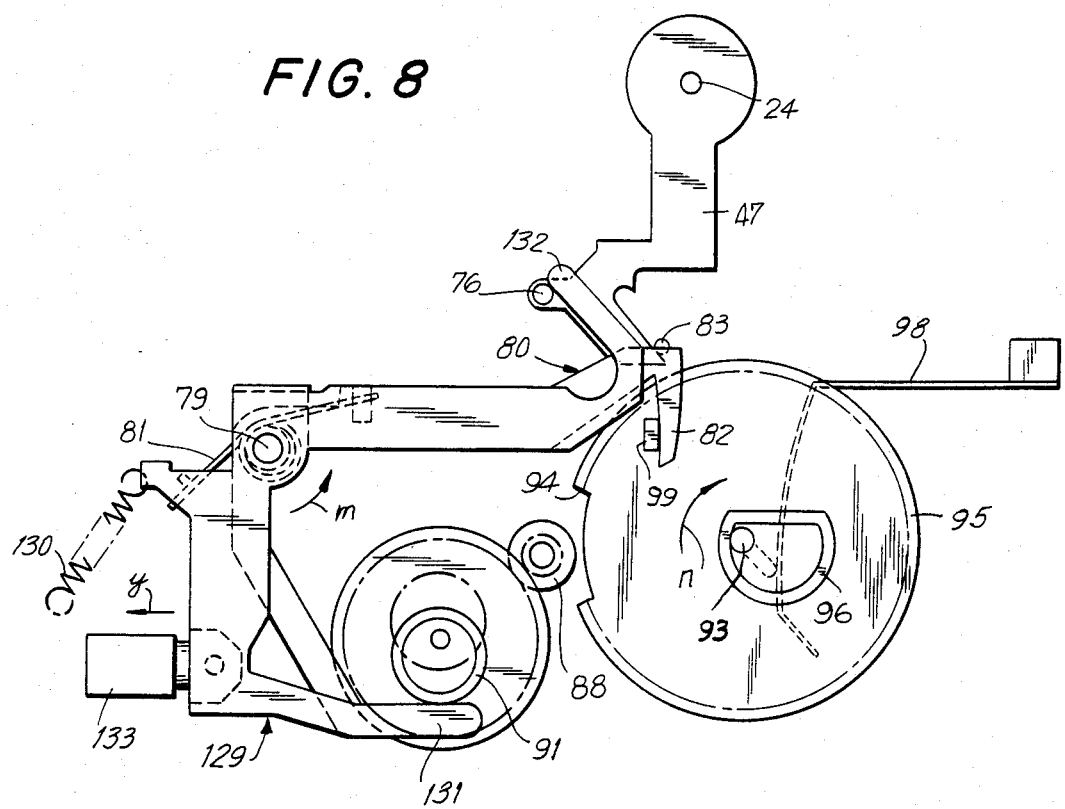
FIG. 8 is a plan view of a mechanism useful in changing the direction of tape drive at a time before the detection of the tape end.
Figure 10:
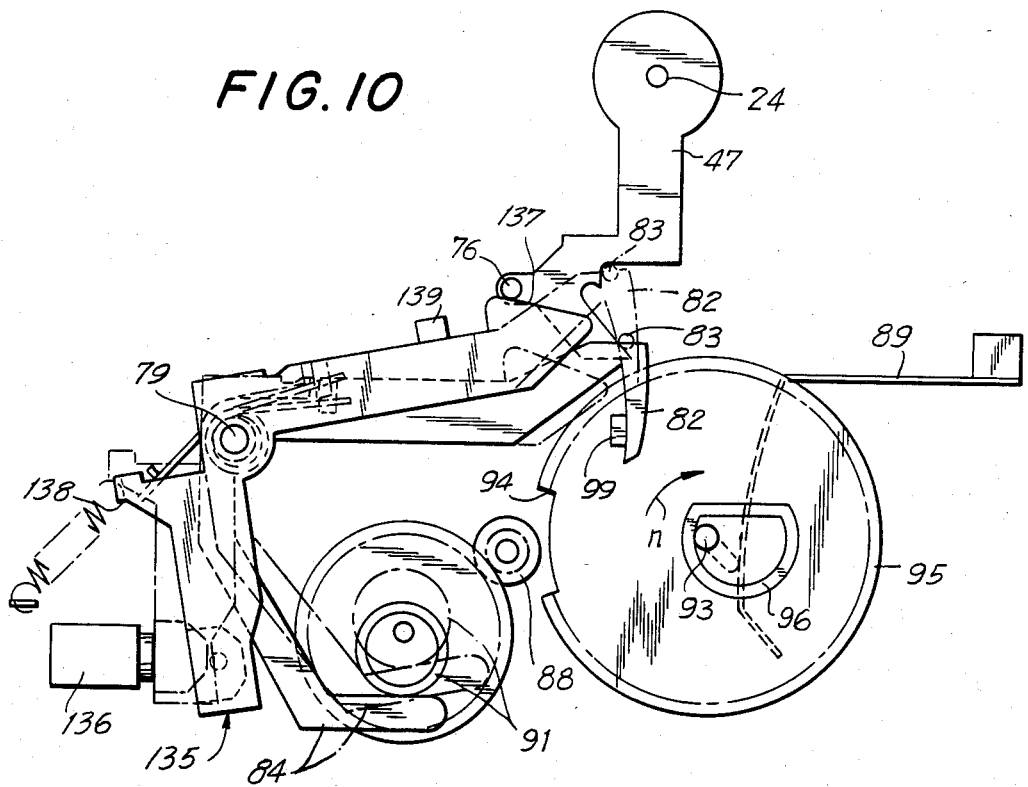
FIG. 10 is a plan view of another embodiment of the mechanism of FIG. 8.

Referring now to FIGS. 8 through 10, a mechanism for changing the direction of tape drive is disclosed, in which the direction of the tape drive is changed at some point before detection of the tape end. In comparing the mechanism of FIG. 8 with that of FIG. 6A, it is seen that the embodiment of FIG. 8 employs a control lever 129 and a plunger-solenoid 133 in addition to the basic mechanism as shown in FIG. 6A. A control lever 129 is rotatably mounted around axis element 79 for rotation independently of cam following arm 80 and is urged to rotate in the direction of arrow m by operation of spring 130. Control lever 129 includes a first extending arm 131 that contacts eccentric cam 91 and another extending arm 132 that contacts pin 76 of detection lever 47. Control lever 129 then is moved along the direction of arrow y when plunger-solenoid 133 is energized.

Figure 9A:
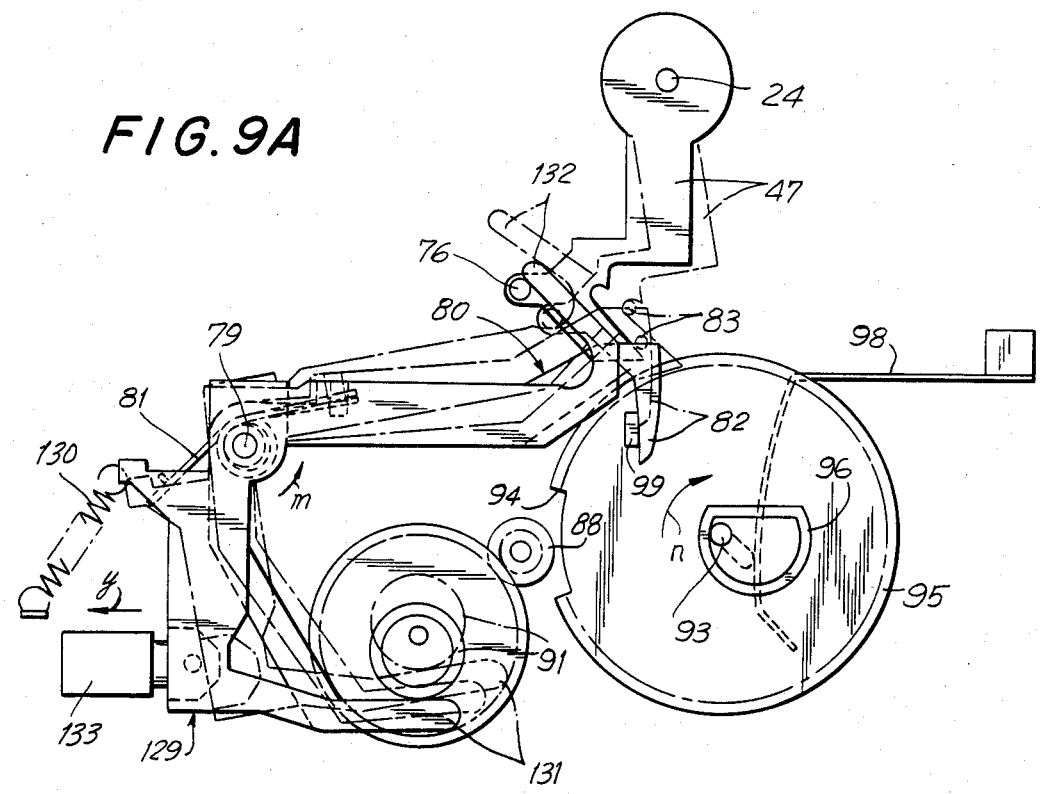
FIGS. 9A and 9B are plan views of the embodiment of FIG. 8 according to the present invention for illustrating the sequential movement thereof.
Figure 9B:
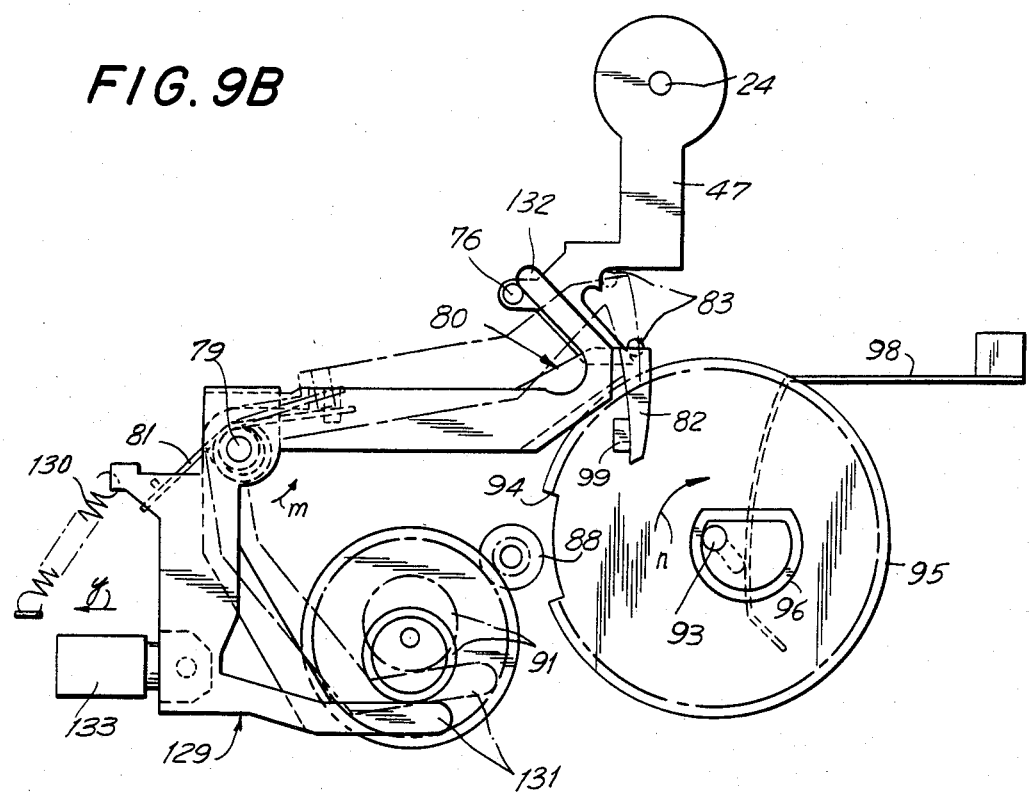

Referring now to FIGS. 9A and 9B, the operation of the embodiment shown in FIG. 8 will be described in detail. As was described in relation to FIG. 6A, when the magnetic tape is running, detecting lever 47 is moved between two end positions repeatedly, such as between the position shown by solid lines and the other position shown by the broken lines in FIG. 9A. Similarly, control lever 129 is moved in response to rotation of eccentric cam 91 so that extension arm 132 also moves between two positions shown by solid lines and broken lines. This reciprocal movement of control lever 129 does not interrupt any movement of detecting lever 47, but when the plunger-solenoid 133 is energized and control lever 129 is then urged to rotate in the direction of arrow y against the force of spring 130, extending arm 132 will be locked in the position shown by solid lines in FIG. 9B. Then, detecting lever 47 is also located by the extending arm 132 in the position shown by the solid lines in FIG. 9B, which is the same position as it was in FIG. 6B. Therefore, as described in detail in relation to the mechanism of FIG. 6B, the stroke for the movement of cam following arm 80 becomes longer so that stopper element 42 releases projection 99 formed on gear 95, and gear 95 and eccentric cam 96 commence to rotate in the direction of arrow n. Therefore, change lever 40 also moves to change the direction of the tape drive, as explained in regard to FIG. 7A and 7B.

The mechanism of FIG. 8 requires the addition of only a few relatively simple parts, such as control lever 129 and plunger-solenoid 133 to the mechanism for automatically reversing or stopping at the tape end as described above, in order to provide an automatic device for changing the direction of the tape drive at a point before the end of the tape. Moreover, this additional mechanism will work without any accidental mishaps, because control lever 129 is locked at the desired position by action of an energized plunger-solenoid 133, and the force generated from plunger-solenoid 133 that attracts control lever 129 can be made quite small because the rotation of eccentric cam 91 acts to aid movement of control lever 133 against the spring force of spring 130. Moreover, if this additional mechanism is accidentially operated unintentionally during a recording mode it is easily seen that the operational mode of the apparatus will change from the record mode to the stop mode, by the release of the appropriate levers, as explained in relation to FIG. 7C.

Referring now to FIG. 10 another embodiment of the mid-tape reversing mechanism shown in FIG. 8 is shown in which an L-shaped control lever 135 is mounted for independent rotation about axis element 79 and has one arm of the ell facing solenoid 136 and at the other arm is provided a tapered contact surface 137. Control lever 135 further contains an armature formed of a permanent magnet at the end which typically contacts the core of solenoid 135 at a position shown by the dashed lines in FIG. 10. Unlike the embodiment of FIG. 8, the normal at rest position of control lever 135 is shown in dashed lines in FIG. 10 and when solenoid 136 is energized a magnetic field generated from the core acts to drive or repel control lever 135 away from the core so that the control lever 137 will be moved to the position shown by the solid lines in FIG. 10 by the force of a spring 138. Because rotation of control lever 137 is limited by a pin 139 affixed to chassis 16, tapered surface 137 will push against pin 76 of detecting lever 47 and interrupt the rotation of such lever against the frictional force provided by the intermediate gear 25. Thus, the position of detecting lever 47 is the same as shown in FIG. 6B and in FIG. 9B and, accordingly, it is clear that the same operation for changing the direction of the tape drive is performed.

In this embodiment, control lever 135 is held in contact with the core of solenoid 136 by the magnetic force generated from the armature against the force of spring 138. When the solenoid is energized it provides enough force to form a magnetic field to cancel the magnetic force form the armature and, therefore, solenoid 136 can be made small and electric power can be conserved as in the embodiment shown in FIG. 8.

Although illustrative embodiment of the present invention have been described in detail above with reference to the accompanying drawings, it is to be understood that the invention is not limited to those precise embodiments, and that various changes and modifications can be effected thereby by one skilled in the art without departing from the scope or spirit of the invention, as defined by the appended claims.

What is claimed is:

1. Apparatus for controlling the operational mode of a tape drive device in a magnetic tape recording and reproducing system of the kind having at least two mode selecting levers mounted on a chassis, the apparatus comprising:
   a slide lever slidably mounted on said chassis for movement between first and second positions, said tape drive device being responsive to said positions of said slide lever;
   bias means for urging said slide lever into said first position;
   locking means for locking said slide lever in said second position against the urging of said bias means, when one of said mode selecting levers is operated to select a playback mode of operation, whereby said slide lever is moved to said second position;
   means for detecting an end of said magnetic tape;

a change lever slidably and rotatably mounted on said chassis for moving between first and second positions upon said detecting of an end of said tape, said change lever being rotated to a slanted position by one of said mode selecting levers being operated to select a recording mode of operation, whereby said change lever is in said slanted position during said moving between said first and second positions only in said recording mode; and when said mode selecting lever is operated for the playback mode, said change lever, said locking means, and said slide lever cooperate so that said change lever moves said slide lever from said first position to said second position and moves said locking means to release said slide lever from said second position, and when said mode selecting lever is operated for the recording mode, the mode of said tape recording and system is changed from the recording mode to a stop mode, in response to movement of said change lever from said first position to said second position in said slanted position.

2. Apparatus according to claim 1, in which said locking means includes a lock plate operably mounted on said chassis and cooperating with said mode selection levers for holding said levers in their respective operative positions against the force of respective return springs included therewith and means for moving said lock plate to release said mode selecting levers in response to said change lever moving between said first and second positions in said slanted position.

3. Apparatus according to claim 1, in which said means for detecting an end of said tape includes a detecting lever frictionally engaged to rotate when said tape drive device is driving said magnetic tape and cooperating with said change lever to move said change lever upon detecting that said tape is not being driven.

4. Apparatus according to claim 3, further comprising a mid-tape control mechanism mounted on said chassis and including a selectively actuatable solenoid operably connected to a detecting-lever hold member, whereby said detecting lever is held at a first position when said detecting lever is frictionally urged to rotate by said tape drive device so that said change lever is moved.

5. Apparatus according to claim 4, in which said hold member is operably connected to said solenoid by a permanent magnet.

6. Apparatus according to claim 1, in which said change lever is slidably and rotatably mounted on said chassis by means of an upraised pin element attached to said chassis for cooperating with an elongated slot formed in said change lever, and a spring for urging said change lever to an inoperative position.

7. Apparatus according to claim 1, in which an upraised wall is formed on said change lever for cooperating with a cam member formed on an intermediate gear element that selectively cooperates with a drive gear of said tape drive device, said intermediate gear element including a peripheral portion without gear teeth, whereby said intermediate gear element is prevented from rotating and there is no relative movement between said wall and said cam member when said peripheral portion is adjacent said drive gear.

8. Apparatus according to claim 1, in which a cam following arm is mounted on said chassis for reciprocal motion in response to an eccentric cam formed on a gear continuously engaged with a tape drive gear of said tape drive device, and said cam following arm cooperates with said means for detecting for moving in a first short stroke when said tape is being driven and in a second long stroke when said tape is stopped.

9. Apparatus for controlling the operational mode of a magnetic tape cassette recording and reproducing system comprising:

a chassis;

a plurality of mode selecting levers slidably mounted on said chassis;

a tape drive device;

a slide lever slidably mounted on said chassis for movement between first and second positions, said tape drive device being operable in response to said positions of said slide lever;

spring means for biasing said slide lever into said first position;

locking means for locking said slide lever in said second position against the biasing of said spring means when one of said plurality of mode selecting levers selects a playback mode of operation, thereby moving said slide lever to said second position;

means for detecting the reaching of an end of said magnetic tape in said cassette being driven by said tape drive device;

a change lever slidably and rotatably mounted on said chassis for moving between first and second positions upon detecting the reaching of an end of said tape;

said change lever being rotated to an operative position presenting a slanted posture by one of said plurality of mode selecting levers selecting a recording mode, whereby said change lever presents said slanted posture during said moving between first and second positions only in said recording mode; and when said mode selecting lever is operated for the playback mode, said change lever, said locking means, and said slide lever cooperate so that said change lever moves said slide lever from said first position to said second position and moves said locking means to release said slide member from said second position, and when said mode selecting lever for the recording mode is operated the mode of said tape recording and reproducing system is changed over from the recording mode to a stop mode, in response to movement of said change lever from said first position to said second position while presenting said slanted posture.

10. Apparatus according to claim 9, in which said locking means includes a lock plate operably mounted on said chassis and cooperating with said plurality of mode selection levers for holding said levers in their respective operative positions against the force of respective return springs included therewith; and means for moving said lock plate to release said respective ones of said plurality of mode selecting levers in response to said change lever moving between said first and second positions while in said slanted posture.

11. Apparatus according to claim 9, in which said means for detecting the reaching of an end of said magnetic tape in said tape cassette includes a detecting lever frictionally engaged to rotate when said tape drive means is driving said tape and cooperating with said change lever to move said change lever upon detecting that said tape is not driven.

12. Apparatus according to claim 11, further comprising a control mechanism including a selectively operable solenoid connected to a detecting-lever hold member, whereby said detecting lever is held at a first position when said detecting lever is frictionally urged to rotate by said tape drive device so that said change lever commences to move.

13. Apparatus according to claim 12, in which said detecting-lever hold member is operably connected to said solenoid by a permanent magnet.

14. Apparatus according to claim 9, in which said change lever is slidably and rotatably mounted on said chassis by means of an upraised pin element affixed to said chassis for cooperating with an elongated slot formed in said change lever and including a spring for urging said change lever to an inoperative position.

15. Apparatus according to claim 9, in which said change lever includes an upraised wall formed thereon and a cam member formed on an intermediate gear element for cooperating with said upraised wall, said intermediate gear element selectively cooperating with a drive gear of said tape drive device, said intermediate gear element including a peripheral portion without gear teeth, whereby said intermediate gear element is prevented from rotating and there is no relative movement between said wall and said cam member when said peripheral portion is in juxtaposition with said drive gear.

16. Apparatus according to claim 9, in which a cam following arm is mounted on said chassis for reciprocal motion in response to an eccentric cam formed on a gear constantly meshed with said tape drive device and said cam following arm cooperates with said means for detecting for moving in a first short stroke when said tape is being driven and in a second long stroke when said tape is stopped.

* * * * *